Aug. 3, 1965          K. W. RANDALL          3,198,301
CLUTCH AND BRAKE WITH RESILIENT OPERATOR
Original Filed Sept. 13, 1961                 3 Sheets-Sheet 2

INVENTOR.
KENNETH W. RANDALL
BY
*Malcolm W. Fraser*
ATTORNEY

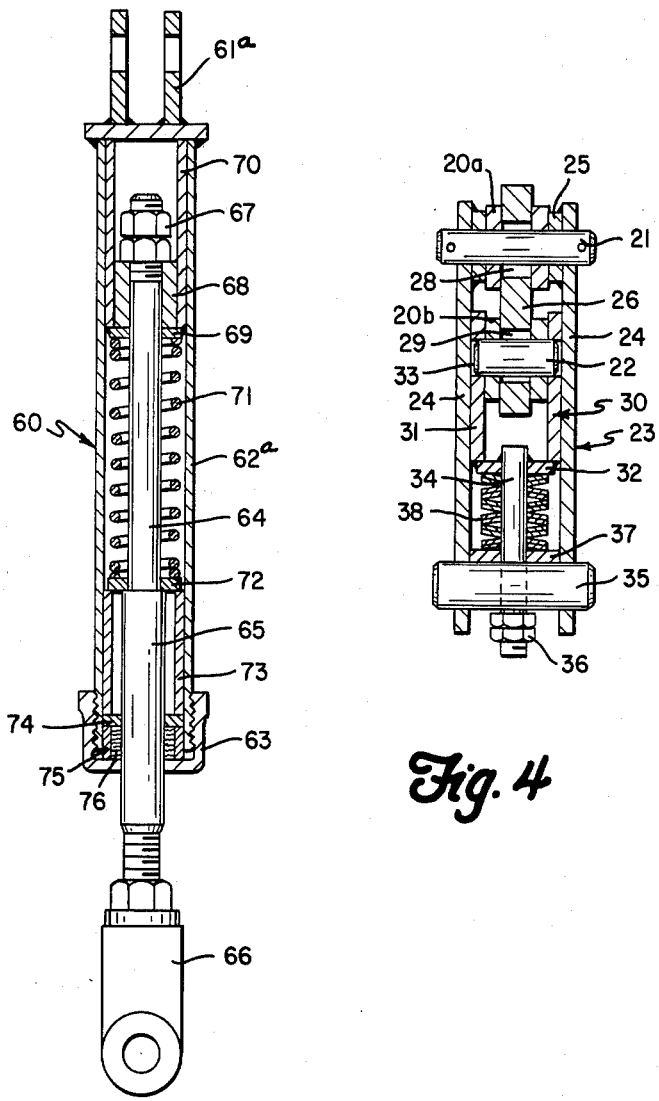

United States Patent Office 3,198,301
Patented Aug. 3, 1965

3,198,301
CLUTCH AND BRAKE WITH
RESILIENT OPERATOR
Kenneth W. Randall, Indianapolis, Ind., assignor to Insley
Manufacturing Corporation, Indianapolis, Ind., a corporation of Indiana
Original application Sept. 13, 1961, Ser. No. 137,881.
Divided and this application Apr. 4, 1963, Ser. No. 270,593
1 Claim. (Cl. 192—17)

This invention relates to brake and clutch assemblies for heavy traveling machines, such as cranes and power shovels in which such assemblies are also employed for steering purposes.

An object is to produce a brake and clutch assembly of this character in which the operation of the brake and clutch are synchronized so that the clutch is engaged after the brake is released, there being a spring device associated with the clutch so that it is spring urged both into and out of operative engagement.

This application constitutes a division of my application Serial No. 137,881, filed September 13, 1961.

Another object is to produce a new and improved brake and clutch assembly having the unique features of construction and operation hereinafter described.

Other objects and advantages will hereinafter appear and, for purposes of illustration and not of limitation, an embodiment of the invention is shown on the accompanying drawings, in which FIGURE 1 is a sectional view of a portion of the frame and driving mechanism of a crawler driven machine, showing a portion of the brake and clutch assemblies;

FIGURE 4 is a longitudinal sectional view of the mounting for the ends of the brake band and the spring device for tensioning same; and FIGURE 5 is a longitudinal sectional view of the spring actuating device for clutch jaw actuation.

Figure 1:
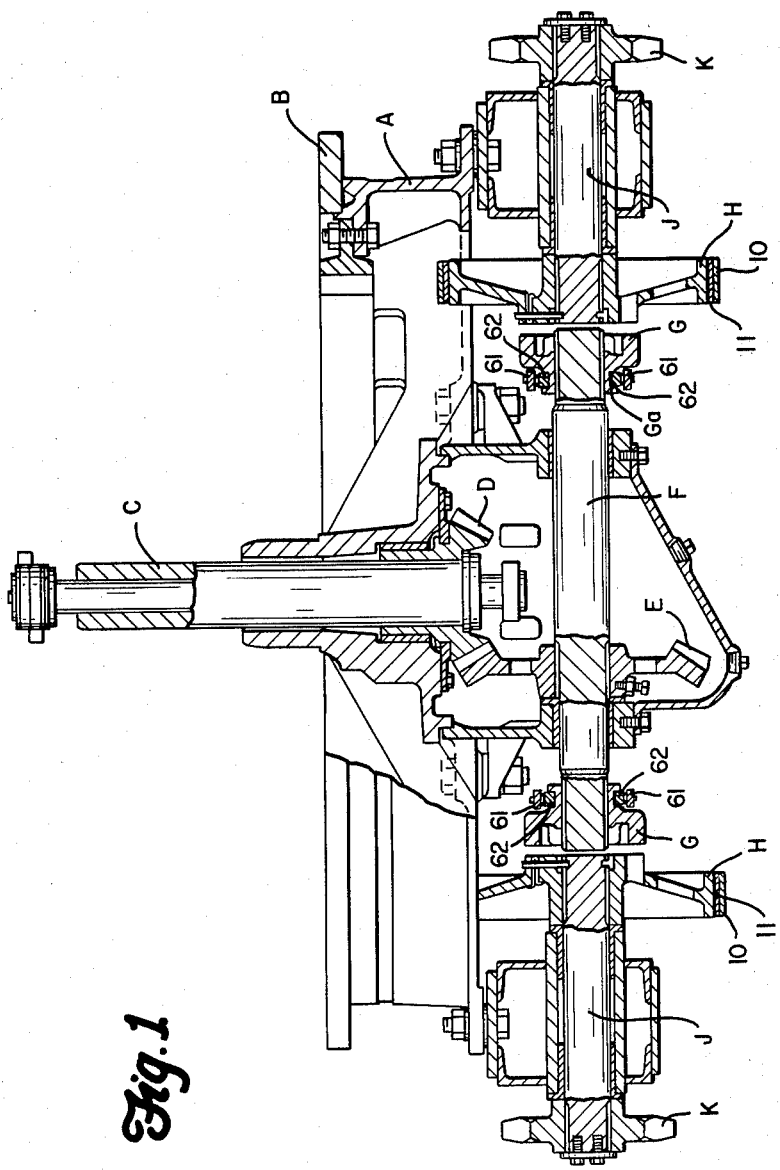

The illustrated embodiment of the invention comprises a brake and clutch assembly for heavy machines, such for example as crawler driven cranes, in which the vehicle is not only braked by the brake mechanism but the brake and clutch mechanisms cooperate also for steering. As shown in FIGURE 1 a portion of a revolving crane chassis is illustrated in which A designates the under frame on which is suitably mounted for rotary movement a turntable assembly indicated at B. Rising centrally through the machine is a vertical propeller shaft C which is suitably power driven. On the lower end of the propeller shaft C is a bevel gear D meshing with a bevel gear E fixed to a cross propeller shaft F. On opposite ends of the cross propeller shaft F are clutch jaws G which are mounted for axially shifting movement to and from brake drums H which have recesses or pockets with which the lugs on the clutch jaw G are adapted respectively to enter. The brake drums H are fixed to shafts J respectively and these shafts are suitably journaled in bearings carried by the frame A. At the outer end of each shaft J is a sprocket gear K which is connected to drive a crawler unit (not shown) for imparting traveling movement to the machine as will be readily understood.

Figure 2:
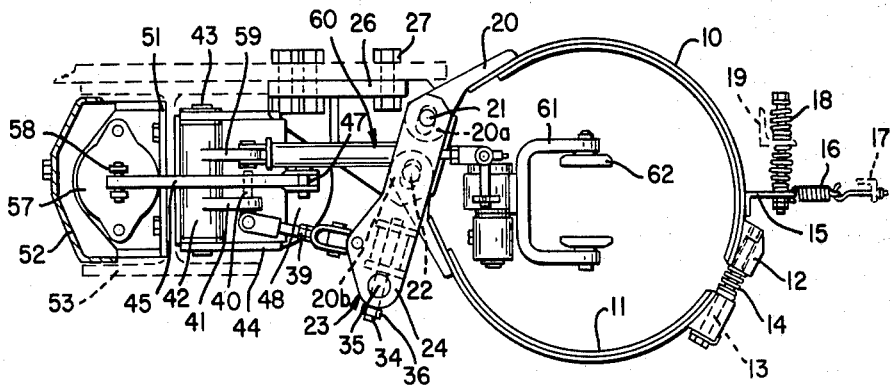
FIGURE 2 is a side elevation of the clutch and brake operating mechanism, parts being omitted for purposes of clarity.
Figure 3:
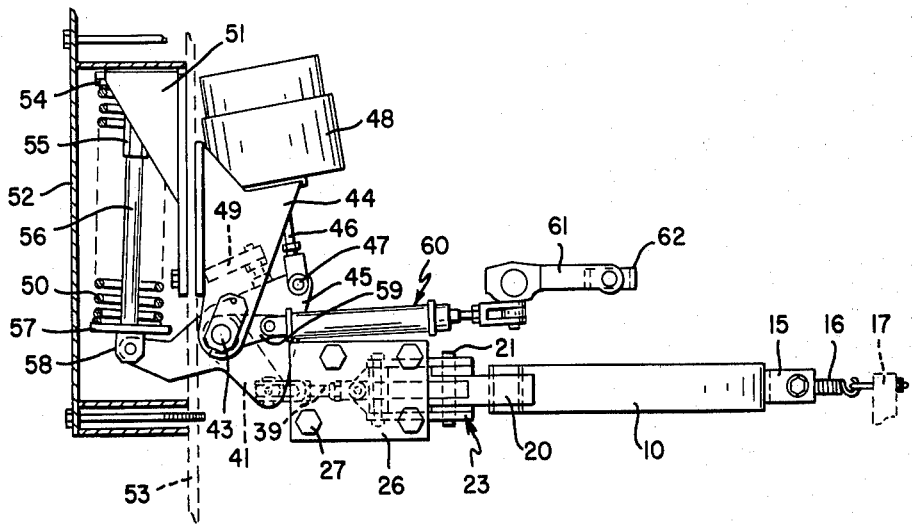
FIGURE 3 is a top plan view partly in section of the mechanism shown in FIGURE 2.

FIGURES 2 and 3 illustrate the brake band mechanisms for engaging the brake drums H and the mechanism for axially shifting the clutch jaws G. As shown, each brake band 10 is in two parts and each carries a lining 11 for engagement with the respective brake drum H. Each of the brake band parts 10 has an integral outwardly extending boss 12, a bolt 13 connecting these bosses with an interposed coil spring 14 which urges the brake band parts away from each other. One of the brake band parts is fixed to an angle member 15 to which a horizontal cushion spring 16 is connected, the opposite end of the spring being connected by a hook member to a rigid frame part 17. Vertical cushion springs 18 are interposed between the angle member 15 and a rigid frame part 19.

On opposite ends of the respective brake band parts 10 are fittings 20, having respectively bifurcated ends 20a and 20b to receive anchor pins 21 and 22 respectively which are carried by a bracket assembly 23. The bracket assembly 23, particularly as shown on FIGURE 4, comprises a pair of spaced side plates 24, at the upper end of which is a pair of spacer plates 25 welded to the inside of the plates 24 respectively and through which the pin 21 extends. As shown, the bifurcated end 20a of a fitting 20 is disposed between the spacer plates 25, and between the bifurcated end 20a is disposed a bracket plate 26 which is rigidly fastened by bolts 27 to a part of the machine frame. The bracket plate 26 has a longitudinally elongated slot 28 through which the anchor pin 21 extends and below the slot 28 is another longitudinally elongate slot 29 through which the anchor pin 22 extends. As shown the anchor pin 22 engages the bifurcated end 20b of a brake band fitting 20 and such bifurcated end is disposed on the outside of the bracket plate 26. Outside of the bifurcated ends 20b and apertured at 33 to receive the end portions of the anchor pin 22 is a slide 30. The slide 30, which is disposed between the side plates 24 of the bracket assembly 23, is composed of a pair of side plates 31 and a welded cross or bottom plate 32.

Fixed to the cross plate 32 of the slide 30 and depending therefrom is a pin 34 which extends through a transverse pivot pin 35. The lower end portion of the pin 34 is threaded to receive nuts 36. Bearing against the pivot pin 35 is a plate 37 providing a seat for one end of a cushioning means arranged on the pin 34, the opposite end of the cushioning means bearing against the plate 32. The cushioning means consists of a series of concavo-convex compression washers 38 which are reversely arranged as shown and are relatively rigid but which will resiliently flex under heavy load conditions incident to machines, such as cranes.

Link means 39 connects the lower portion of the bracket assembly 23 to the outer end of a cross pin 40 which is carried by the free end portion of a rock arm 41. The rock arm 41 is rigid with an elongate sleeve 42 which is mounted for oscillating movements on a shaft 43 suitably carried by a rigid bracket 44. Also fixed to the elongate sleeve 42 for rocking movements therewith and spaced from the rock arm 41 is a generally triangularly shaped rock arm or bell crank 45 to which the pin 40 is also connected. Pivoted to one end of the bell crank 45 by a clevis 47 is a piston rod 46. The piston or actuating part for the piston rod 46 is disposed within an air cylinder 48 secured to the bracket 44. Air under pressure is supplied to the cylinder 48 in any suitable manner with suitable valve controls (not shown).

The arrangement is such that when air under the required pressure is admitted to the cylinder 48, the bell crank 45 is rocked to effect a movement of the bracket 23 in a clockwise direction (FIGURE 2) thereby to release the brake band about the brake drum H. Rocking movement of the bell crank 45 in one direction is limited by an adjustable stop 49 carried by the bracket 44. The bell crank is normally maintained against the stop 49 by means of a coil spring 50 which is carried by a supporting bracket 51 suitably fixed to the machine frame. The coil spring 50 is disposed within a guard or housing 52, attached to a frame part 53. The suporting bracket 51 has an upper spring seat 54 against which the upper end of the coil spring 50 abuts and from which depends a guide tube 55. A rod 56 has one end slidable in the guide 55 and extends through the spring and has at its opposite end a spring seat 57 against which the opposite end of the spring 50 bears. On the under side of the spring seat 57 is clevis 58 pivotally connected to the adjacent end of the bell crank 45.

It will thus be seen that the spring 50 normally urges the bell crank 45 in a counter-clockwise direction (FIGURE 3) urging it against the adjustable stop 49. The arrangement is such that the coil spring operates to apply the brake whereas the air cylinder and associated parts effects release of the brake. Thus the coil spring 50 rocks the bracket 23 and associated parts in a right hand direction (FIGURE 2) to apply the brake whereas the air cylinder operates to move the bracket 23 and associated parts to the left of the figure for releasing the brake. Manifestly should the air pressure fail for any reason the coil spring 50 operates abruptly and automatically to apply the brake.

For operating the jaw clutches G, there is associated with the mechanism above described jaw clutch operating means individual to each clutch. As shown, an arm 59 has one end rigid with the sleeve 42 for oscillating movements therewith. The opposite end of this arm is connected by a spring device, generally indicated at 60, with an operating yoke unit 61 so that by rocking movement of the arm 59 in one direction shifts the respective jaw clutch G into operative engagement with the hub of the brake drum H and when the arm 59 is rocked in the opposite direction the jaw clutch is moved away from and disconnected from the recesses or pockets on the brake drum. H. The yoke unit 61 has a pair of pivotally mounted shoes 62 which engage in the annular groove Ga (FIGURE 1) forming a part of the respective jaw clutch as will be readily understood by those skilled in this art.

The spring device 60 comprises a clevis 61a disposed at one end for pivotal engagement with the actuating arm 59. Rigid with the clevis 61a is an elongate tubular housing 62a closed at the opposite end by a screwed-on end cap 63. Extending inside of the housing is a rod 64 which has an enlarged end portion 65 carrying a clevis 66 for attachment to the respective operating yoke unit 61. The opposite end of the rod is screw threaded to receive lock nuts or abutment means 67 which bear against a sleeve 68. A washer 69 abuts against an elongate sleeve or stop means 70 and also against the sleeve 68. A coil spring 71 bears at one end and against the opposite face of the washer 69 at one end and at the opposite end against a second washer 72 which bears against a shoulder on the end of the enlarged end portion 65 of the rod and also against an elongate sleeve or abutment 73. The opposite end of the sleeve or abutment 73 bears against a washer 74 which in turn bears against a short sleeve 75 containing a suitable packing 76.

It will be understood that the spring device 60 is such that a cushioning effect takes place in either direction of movement of the operating arm 59. Thus in actuating a jaw clutch G into operative engagement with the recesses or pockets on the hub of the adjacent brake drum H for driving the respective sprocket wheel K, a cushioning action is afforded so as to snap the jaw clutch into engagement when sufficient movement has been made to align the respective jaws. The arrangement is such as automatically to release the jaw clutch when power is released. The brake may be released without the jaw clutch engaging the drive mechanism but applies pressure sufficient to snap the jaw clutch into engagement when sufficient movement has been made for aligning the jaws. This arrangement is of importance in preventing possible runaway of the machine on a hill or incline.

From the above description it will be apparent that the brake band 10 is semi-self-energizing because of the design of the brake anchor which is slotted allowing the band to shift in relation to the direction of rotation of the brake drum, thereby affording a dead center in either direction and having a semi-self-energizing effect in either direction. The spring arrangement 38 and associated parts are such as to impart a constant pressure for contracting the brake band about the brake drum.

Numerous changes in details of construction, arrangement and operation may be effected without departing from the spirit of the invention especially as defined in the appended claim.

What I claim is:

A brake and clutch assembly for a heavy traveling machine, such as a crane, comprising a brake, a jaw clutch including an axially shiftable driven jaw member, common means for actuating said brake and driven jaw member in a predetermined manner, said common means including an oscillatable sleeve, separate means to rock said sleeve respectively in one direction or the other for selectively actuating said brake and driven jaw member, said common means including link and lever means operatively connected to said driven jaw member and brake respectively, said link and lever means extending to the driven jaw member comprising an actuating arm rigid with said sleeve and extending outwardly therefrom for oscillating movements therewith, an elongate tubular housing, a pivotal connection between one end of said housing and said rigid arm, a rod extending inside of said housing from the end opposite to that connected to said rigid arm, an operating member for said driven jaw member effective upon oscillation of said rigid arm in one direction to shift said jaw member into clutching engagement and in the opposite direction to shift said jaw member out of clutching engagement, a pivotal connection between the opposite end of said rod and said operating member, abutment means on the inner end portion of said rod which is disposed within said housing, a sleeve within said housing and in which said rod is slideable and against which one end of said abutment means bears when said rod is moved axially in a direction outwardly of said housing, a washer against which said sleeve is adapted to abut, stop means outside of said first sleeve and against which said washer is also adapted to bear, a helical coil spring about said rod and bearing at one end against the inner end of said washer, a shoulder on said rod disposed within said tubular housing and spaced axially from said washer, a second washer on said rod providing a seat for the opposite end of said coil spring and abutting against said shoulder, and an abutment for limiting the movement of said second washer in a direction away from said first washer, the spring arrangement being such that cushioning takes place in either direction of oscillation of said rigid actuating arm and the coil spring is compressed upon movement of the rod in either direction.

References Cited by the Examiner

UNITED STATES PATENTS

| | | | |
|---|---|---|---|
| 1,315,980 | 9/19 | Morris | 192—17 |
| 2,139,198 | 12/38 | Miller | 192—17 |
| 2,539,545 | 1/51 | Ljungkoll. | |
| 2,641,342 | 6/53 | Hasbrouck | 192—109 X |
| 2,804,925 | 9/57 | Hitchock et al. | |
| 3,043,445 | 7/62 | Holmes. | |

DAVID J. WILLIAMOWSKY, *Primary Examiner.*